United States Patent
Sarfare et al.

(10) Patent No.: US 9,367,413 B2
(45) Date of Patent: Jun. 14, 2016

(54) DETECTING DATA LOSS DURING SITE SWITCHOVER

(71) Applicant: NetApp, Inc., Sunnyvale, CA (US)

(72) Inventors: Parag Sarfare, Sunnyvale, CA (US); Joanne Mikkelson, Sunnyvale, CA (US); Joseph Brown, Research Triangle Park, NC (US)

(73) Assignee: NetApp, Inc., Sunnyvale, CA (US)

(*) Notice: Subject to any disclaimer, the term of this patent is extended or adjusted under 35 U.S.C. 154(b) by 163 days.

(21) Appl. No.: 14/266,733

(22) Filed: Apr. 30, 2014

(65) Prior Publication Data

US 2015/0317226 A1 Nov. 5, 2015

(51) Int. Cl.
*G06F 11/00* (2006.01)
*G06F 11/20* (2006.01)
*G06F 11/07* (2006.01)

(52) U.S. Cl.
CPC ........ *G06F 11/2094* (2013.01); *G06F 11/0727* (2013.01); *G06F 11/2017* (2013.01); *G06F 11/2023* (2013.01); *G06F 11/2069* (2013.01)

(58) Field of Classification Search
CPC ............ G06F 11/2094; G06F 11/0709; G06F 11/0727; G06F 11/073; G06F 11/2017; G06F 11/2023; G06F 11/2053; G06F 11/2056; G06F 11/2069; G06F 11/2071; G06F 11/2082; G06F 11/2089
USPC ........ 714/6.3, 4.1, 4.11, 6.1, 6.21, 6.31, 6.32, 714/42

See application file for complete search history.

(56) References Cited

U.S. PATENT DOCUMENTS

| | | | |
|---|---|---|---|
| 6,178,519 B1 * | 1/2001 | Tucker | G06F 17/30607 707/999.01 |
| 7,003,694 B1 * | 2/2006 | Anderson, Jr. | G06F 11/2023 707/999.202 |
| 8,327,186 B2 | 12/2012 | Coatney et al. | |
| 2005/0229021 A1 * | 10/2005 | Lubbers | G06F 11/2069 714/2 |
| 2006/0271605 A1 * | 11/2006 | Petruzzo | G06F 17/30289 |
| 2009/0300298 A1 * | 12/2009 | Ash | G06F 11/1441 711/156 |
| 2014/0047263 A1 | 2/2014 | Coatney et al. | |
| 2015/0170764 A1 * | 6/2015 | Budhabhatti | G06F 13/1694 714/718 |

* cited by examiner

*Primary Examiner* — Joseph D Manoskey
(74) *Attorney, Agent, or Firm* — Cooper Legal Group, LLC

(57) ABSTRACT

Techniques for detecting data loss during site switchover are disclosed. An example method includes storing at NVRAM of a first node a plurality of operations of a second node, the first and second nodes being disaster recovery partners. The method also includes during a switchover from the second node to the first node, receiving an indication of a first number of operations yet to be completed. The method further includes comparing the first number to a second number of operations in the plurality of operations stored at the NVRAM of the first node. The method also includes in response to the comparing, determining whether at least one operation is missing from the plurality of operations stored in the NVRAM of the first node. The method further includes in response to determining that at least one operation is missing, failing at least one volume.

20 Claims, 6 Drawing Sheets

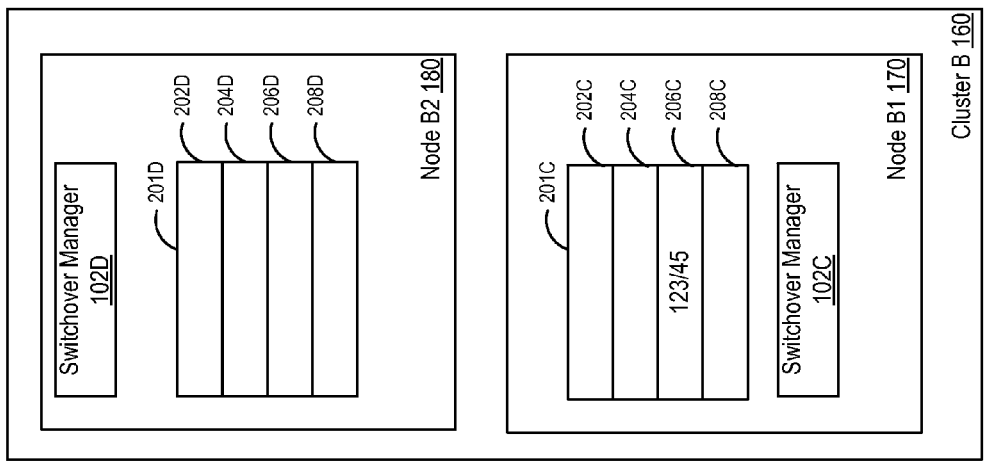
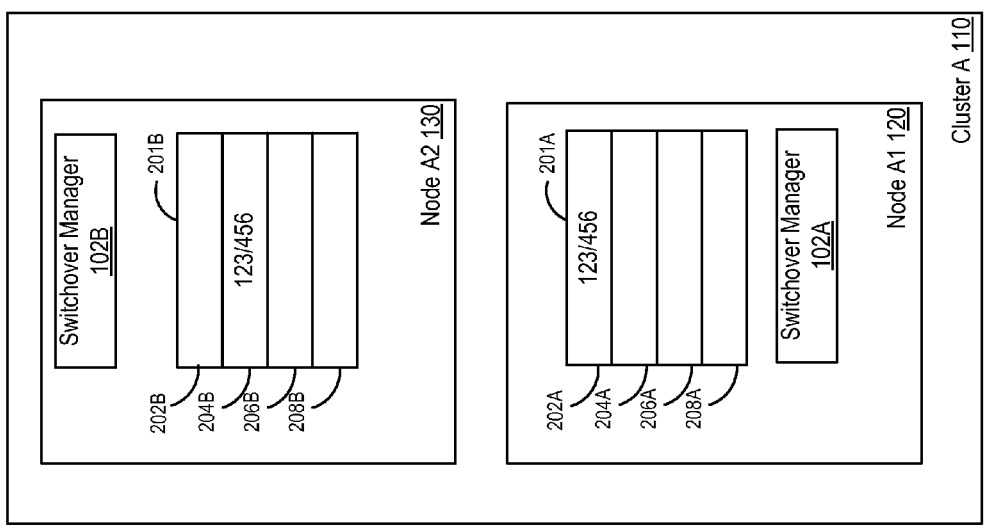
FIG. 2

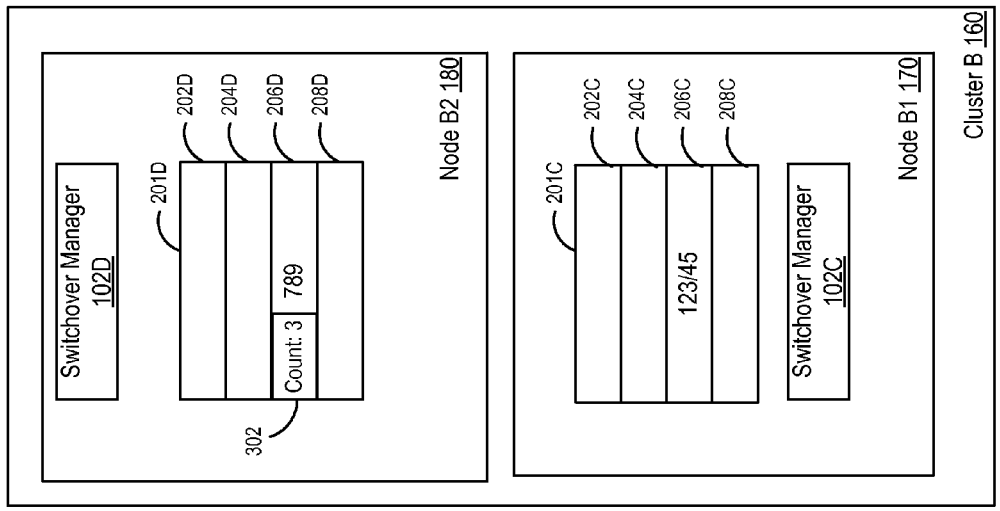
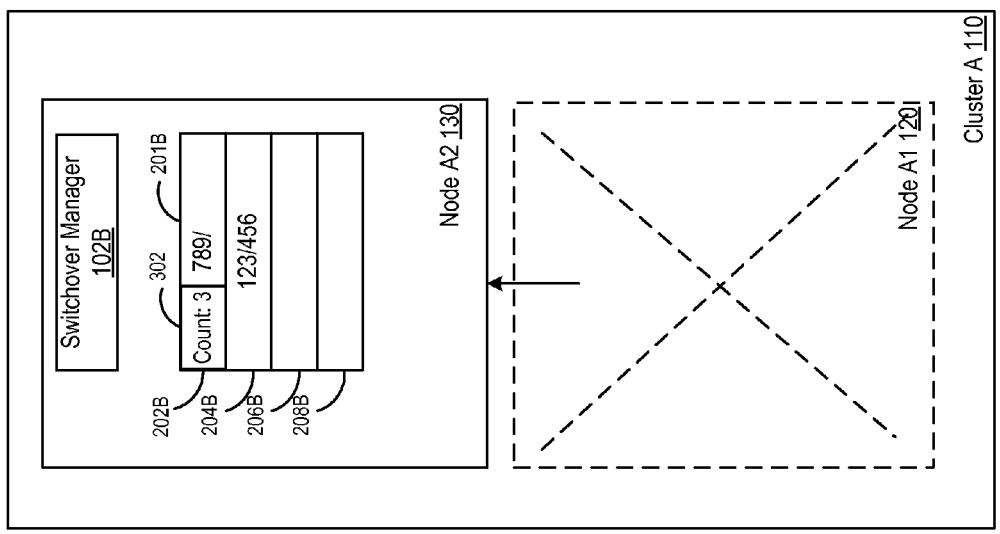
FIG. 3

DETECTING DATA LOSS DURING SITE SWITCHOVER

TECHNICAL FIELD

Examples of the present disclosure generally relate to computer systems, and more specifically, relate to detecting data loss in high availability data storage.

BACKGROUND

A storage server is a computer system that performs data storage and retrieval for clients over a network. For example, a storage server may carry out read and write operations on behalf of clients while interacting with storage controllers that transparently manage underlying storage resources (e.g., disk pools). Example methods of providing network accessible storage include network-attached storage (NAS) and storage area networks (SANs).

Network-attached storage (NAS) is a file-level storage system that provides clients with data access over a network. In addition, a storage area network (SAN) is a type of specialized high-speed network that interconnects clients with shared storage resources. Either type of distributed storage system may include storage controllers that implement low-level control over a group of storage drives to provide virtualized storage. Storage nodes may include storage servers and/or storage controllers in some examples.

Storage nodes may be clustered together to provide high-availability data access. For example, two storage nodes may be configured so that when one node fails, the other node continues processing without interruption. In addition, different sets of clustered storage may exist in different locations to provide disaster recovery (DR) in the event of failure or loss of communication at one site. If a first cluster fails, nodes in a second cluster that are DR partners of nodes in the first cluster may seamlessly assume or takeover operations for the nodes in the first cluster with little or no disruption. This may be referred to as a site switchover. In certain scenarios, data loss may occur when updates on one node are not transferred to a DR site before site switchover occurs. In such a scenario, it may be difficult to detect the data loss.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

FIG. 2 illustrates an example system architecture for mirroring data stored in NVRAM of a node to another node, in accordance with various examples of the present disclosure.

FIG. 3 illustrates a takeover of a node by its high-availability (HA) partner, in accordance with various examples of the present disclosure.

DETAILED DESCRIPTION

Figure 1:
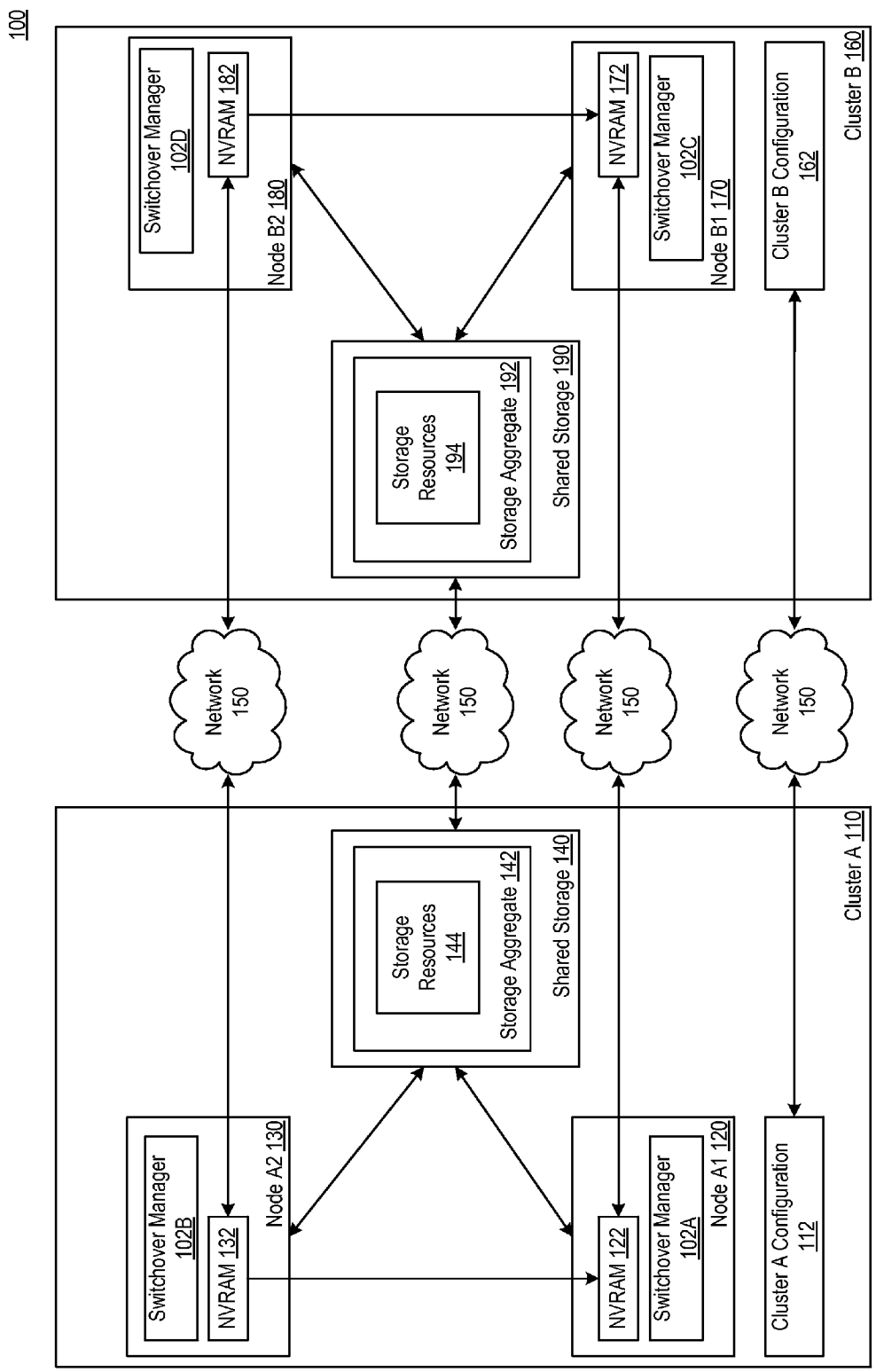
FIG. 1 illustrates an example system architecture for detecting data loss during site switchover, in accordance with various examples of the present disclosure.

Disclosed herein are systems, methods, and computer program products for detecting data loss when performing failover across sites.

In an example, two high-availability (HA) storage clusters are configured as disaster recovery (DR) partners at different sites connected via a network. In an example, the network is a high-speed network. Each cluster processes its own client requests independently and can assume operations of its DR partner when an outage occurs. Transactions performed on each cluster are replicated to the other respective cluster, thus allowing seamless failover during a site outage.

In an example, data loss may occur when network communication is disrupted between sites prior to switchover. For example, a network issue may interrupt data replication so that some updates do not reach a failover site before site switchover occurs. In such scenarios, the failover site is unaware of undelivered updates and might unknowingly begin processing requests with an incomplete data set after switchover. Such data loss could result in errors and business disruption in financial, manufacturing, and other types of systems where data loss is unacceptable.

In an example, a first cluster includes a first node that receives a plurality of operations from a client. The first node stores the plurality of operations at a local non-volatile random access memory (NVRAM) of the first node before completing the plurality of operations (e.g., writing the plurality of operations to a storage volume). NVRAM is non-volatile memory, which generally refers to computer memory that retains stored information even when a computer system is powered off. NVRAM is further discussed below. The first cluster also includes a second node that is a high-availability (HA) partner of the first node. A HA pair generally describes two nodes that are configured to provide redundancy and fault tolerance by taking over operations and/or resources of a HA partner to provide uninterrupted service when the HA partner becomes unavailable. Operations that are stored in the local NVRAM of the first node are mirrored to the second node, which is the HA partner of the first node. If the first node fails, the second node may seamlessly assume or takeover operations for the first node with little or no disruption. This may be referred to as a local takeover.

To provide additional redundancy and increased resiliency against natural disasters and other events that may impact site availability, a second cluster may be configured as the disaster recovery (DR) partner of the first cluster. A DR pair generally describes two nodes that are located in different clusters and are configured to provide redundancy and fault tolerance by taking over operations and/or resources of a DR partner to provide uninterrupted service when the DR partner becomes unavailable. For example, when the nodes in the first cluster fail, the nodes in the second cluster may take over operations for the nodes in the first cluster.

The second cluster may include a third node and a fourth node, where the first node included in the first cluster is a DR partner of the third node included in the second cluster. Additionally, the second node included in the first cluster is a DR partner of the fourth node included in the second cluster. The content (e.g., plurality of operations) stored at the first node's NVRAM is mirrored to the third node. If the first cluster fails, the second cluster may seamlessly assume or takeover operations for the first cluster with little or no disruption. This may be referred to as a remote takeover or switchover. After the switchover, the third node may takeover operations for the first node, which is the third node's DR partner. Additionally, the fourth node may takeover operations for the second node, which is the fourth node's DR partner.

In an example, data loss may be prevented by keeping track of how many operations are yet to be completed at a site (e.g., at the first node). During the switchover from the first to the third node, the third node may receive an indication of a number of operations yet to be completed by the first node. The number of operations yet to be completed by the first node indicates how many operations should be stored at the third node such that it may detect data loss and also prevent data corruption. For example, the third node may detect whether data operations stored at the first node were lost and whether each operation of the plurality of operations was successfully mirrored to the third node.

The first number of operations yet to be completed by the first node may be compared to a second number of operations in the plurality of operations stored at the NVRAM of the third node. The second number of operations indicates how many operations were actually sent by the first node and received by the third node. The first number may be greater than or equal to the second number. The third node may determine, based on the comparison, whether at least one operation is missing from the plurality of operations stored in the NVRAM of the third node. If the third node determines that at least one operation is missing from the plurality of operations stored in the NVRAM of the third node, it may fail at least one volume that is affected by the missing operation. In this embodiment, failing a volume may include suspending operation of the volume or otherwise making the volume unavailable for storage operations until repair and/or remediation can be undertaken.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

FIG. 1 illustrates an example system architecture for detecting data loss during site switchover, in accordance with various examples of the present disclosure. System architecture 100 includes cluster A 110, cluster B 160, and network 150.

Any component or combination of components in cluster A 110 or cluster B 160 may be part of or may be implemented with a computing device. Examples of computing devices include, but are not limited to, a computer, workstation, distributed computing system, computer cluster, embedded system, stand-alone electronic device, networked storage device (e.g., a storage server), mobile device (e.g. mobile phone, smart phone, navigation device, tablet or mobile computing device), rack server, storage controller, set-top box, or other type of computer system having at least one processor and memory. Such a computing device may include software, firmware, hardware, or a combination thereof. Software may include one or more applications and an operating system. Hardware may include, but is not limited to, one or more processors, types of memory and user interface displays.

A storage controller is a specialized computing device that provides clients with access to storage resources. A storage controller usually presents clients with logical volumes that appear as a single unit of storage (e.g., a storage drive, such as a solid-state drive (SSD) or a disk). However, logical volumes may be comprised of one or more physical storage drives. For example, a single logical volume may be an aggregation of multiple physical storage drives configured as a redundant array of independent disks (RAID). RAID generally refers to storage technology that combines multiple physical storage drives into a single logical unit, for example, to provide data protection and to increase performance. In an example, a storage server may operate as part of or on behalf of network attached storage (NAS), a storage area network (SAN), or a file server by interfacing with a storage controller and a client. Further, a storage server also may be referred to as a file server or storage appliance.

Cluster A 110 includes cluster A configuration 112, node A1 120, node A2 130, and shared storage 140. Cluster B 110 includes cluster B configuration 162, node B1 170, node B2 180, and shared storage 190. A cluster generally describes a set of computing devices that work together for a common purpose while appearing to operate as a single computer system. Clustered computing devices usually are connected via high-speed network technology, such as a fast local area network (LAN) or fibre channel connectivity. Clustering generally may be used, for example, to provide high-performance and high availability computing solutions.

In an example, cluster A 110 is a high availability (HA) cluster at one geographic location or "site" that uses node A1 120 and node A2 130 as a high availability (HA) pair of computing devices to provide access to computer systems, platforms, applications and/or services with minimal or no disruption. Similarly, cluster B 160 also is a high availability (HA) cluster at a different geographic location or "site" than cluster A 110, which uses node B1 170 and node B2 180 as a high availability (HA) pair to provide access to computer systems, platforms, applications and/or services at a different location with minimal or no disruption.

In an example, cluster A 110 and cluster B 160 each may provide users with physical and/or virtualized access to one or more computing environments, networked storage, database servers, web servers, application servers, software applications or computer programs of any type, including system processes, desktop applications, web applications, applications run in a web browser, web services, etc.

While cluster A 110 and cluster B 160 each provide high availability (HA) services for a site, each cluster itself is susceptible to disruptive events that can occur at a particular location. For example, an entire site may become unavailable for one or more various reasons, including an earthquake, a hurricane, a flood, a tornado, a fire, an extended power outage, a widespread network outage, etc. In addition, a site may need to be shutdown periodically for maintenance or other purposes, such as relocation.

To provide additional redundancy and increased resiliency against natural disasters and other events that may impact site availability, cluster A 110 and cluster B 160 may be configured as disaster recovery (DR) partners. In an example, cluster B 160 serves as a DR partner for cluster A 110 (and vice versa). A node in cluster A 110 and a node in cluster B 160 comprise storage nodes in a geographically-distributed cluster.

In an example, cluster A 110 may be located at a first site (e.g., San Francisco) and cluster B 160 may be located at a second site 50-100 miles away (e.g., San Jose). Transactions occurring on cluster A 110 are replicated or copied to cluster B 160 over network 150 and then replayed on cluster B 160 to keep the two clusters synchronized. Thus, when a site outage occurs or cluster A 110 is unavailable for some reason, cluster B 160 may take over operations for cluster A 110 via an automated or manual switchover.

A switchover generally refers to switching or transferring processing from one computing resource (e.g., a computer system, cluster, network device, etc.), to another redundant or backup computing resource. Automated switchover sometimes may be referred to as a "failover." However, switchover generally refers to an automated, semi-automated, or manual switchover operation.

In the example described above, cluster B 160 serves as a DR partner for cluster A 110. Similarly, cluster A 110 also may serve as a DR partner for cluster B 160. In one example, cluster A 110 and cluster B 160 each may receive and process its own user requests. Transactions occurring at each respective site may be replicated or copied to the other DR partner (e.g., a cluster at a different site), and the DR partner may assume or takeover operations when switchover occurs.

In an example, transactions from one cluster are replicated or copied across a network 150 to a DR partner at a different location. Network 150 may generally refer to a public network (e.g., the Internet), a private network (e.g., a local area network (LAN), a metropolitan area network (MAN), a wide area network (WAN)), fibre channel communication, an inter-switch link, or any combination thereof. In an example, network 150 is a redundant high-speed interconnect between cluster A 110 and cluster B 160.

In an example, configuration information is synchronized with a DR partner to ensure operational consistency in the event of a switchover. For example, cluster configuration data may be indicated by an administrator upon configuration and then periodically updated. Such data may be stored as metadata in a repository that is local to a cluster. However, to provide consistent and uninterrupted operation upon switchover to a DR partner cluster at a different site, configuration information should be synchronized between the clusters.

In an example, cluster A configuration 112 data is synchronized with cluster B configuration 162 data when cluster A 110 and cluster B 160 are DR partners. For example, cluster A configuration 112 data and associated updates may be replicated or copied to cluster B configuration 162 (and vice versa) so that cluster A configuration 112 data and cluster B configuration data 162 are identical and either cluster may assume operations of the other without complication or interruption upon switchover.

A HA pair generally describes two nodes that are configured to provide redundancy and fault tolerance by taking over operations and/or resources of a HA partner to provide uninterrupted service when the HA partner becomes unavailable. In an example, a HA pair may be two storage systems that share multiple controllers and storage. The controllers may be connected to each other via a HA interconnect that allows one node to serve data residing on storage volumes of a failed HA partner node. Each node may continually monitor its partner and mirror non-volatile memory (NVRAM) of its partner. The term "takeover" may be used to describe the process where a node assumes operations and/or storage of a HA partner. Further, the term "giveback" may be used to describe the process where operations and/or storage is returned to the HA partner.

In an example, node A1 120 and node A2 130 are computing devices configured as a high availability (HA) pair in cluster A 110. Similarly, node B1 170 and node B2 180 also are configured as a HA pair in cluster B 160. Each of node A1 120, node A2 130, node B1 170 and node B2 180 may be specialized computing devices, such as storage controllers or computing devices that interact with one or more storage controllers.

In an embodiment, each node in cluster A 110 and cluster B 160 includes its own local NVRAM that stores data. For example, node A1 120 includes NVRAM 122, node A2 130 includes NVRAM 132, node B1 170 includes NVRAM 172, and node B2 180 includes NVRAM 182. Non-volatile memory generally refers to computer memory that retains stored information even when a computer system is powered off.

One type of NVRAM is static random access memory (SRAM), which is made non-volatile by connecting it to a constant power source, such as a battery. Another type of NVRAM uses electrically erasable programmable read-only memory (EEPROM) chips to save contents when power is off. EEPROM memory retains contents even when powered off and can be erased with electrical charge exposure. Other NVRAM types and configurations exist and can be used in addition to or in place of the previous illustrative examples.

In an example, when a client performs a write operation, a responding node (e.g., node A1 120) first writes the data to its local NVRAM (e.g., NVRAM 122) instead of writing the data to a storage volume. A node first may write data to local NVRAM and then periodically flush its local NVRAM to a storage volume to provide faster performance. NVRAM protects the buffered data in the event of a system crash because NVRAM will continue to store the data even when a node is powered off. Accordingly, NVRAM may be used for operations that are "inflight" such that the inflight operation does not need to be immediately stored to a storage volume and an acknowledgement indicating that the operation was processed may be sent to the client. The NVRAM may provide for quicker processing of operations.

A consistency point may refer to the operation of synchronizing the contents of NVRAM to a storage volume. In an example, after a certain threshold is exceeded (e.g., time period has elapsed or a particular amount of memory is stored in NVRAM), a consistency point may be invoked to synchronize the contents of NVRAM to a storage volume. In an example, the data stored in NVRAM that has been flushed to a storage volume is marked as dirty and overwritten by new data. In another example, the data stored in NVRAM that has been flushed to a storage volume is removed from the NVRAM. While data stored at a partition of NVRAM is being flushed to a storage volume, a different portion of the NVRAM may be used to store data (e.g., incoming operations).

To further protect against potential data loss, local NVRAM also may be mirrored to a HA partner. In an example, contents of NVRAM 132 of node A2 130 are replicated or copied to NVRAM 122 of node A1 120 on cluster A 110. Thus, if node A2 130 were to fail, a copy of NVRAM 132 exists in NVRAM 122 and may be extracted and written to storage volume by node A1 120 to prevent data loss.

Similarly, local NVRAM also may be mirrored to a node of another cluster at a different site, such as a DR partner, to provide two-way NVRAM mirroring. For example, NVRAM 132 of node A2 130 may be mirrored, replicated, or copied to both NVRAM 122 of node A1 120 (which is node A2 130's HA partner) and also to NVRAM 182 of node B2 180 (which is node A2 130's DR partner) on cluster B 160. In an example, Cluster A 110 may fail and an administrator may perform a switchover to cluster B 160. Since node B2 180 has a copy of NVRAM 132 from node A2 130 in NVRAM 182, the replicated data from NVRAM 132 can be extracted and written to storage volume as part of the switchover operation to avoid data loss.

In an example, node B1 170 is not a HA partner of node A1 120 or node A2 130 and is not a DR partner of node A2 130 or of node B2 180. Similarly, node B2 180 is not a HA partner of node A1 120 or node A2 130 and is not a DR partner of node A1 120 or of node B2 180.

In cluster A 110, both node A1 120 and node A2 130 access shared storage 140. Shared storage 140 of cluster A 110 includes storage aggregate 142 and storage resources 144. Similarly, both node B1 170 and node B2 180 access shared storage 190 of cluster B 160. Shared storage 190 of cluster B 160 includes storage aggregate 192 and storage resources 194. Shared storage 140 and shared storage 190 may be part of the same storage fabric, providing access across different sites via high speed metropolitan and/or wide area networks.

The various embodiments are not limited to any particular storage drive technology and may use, e.g., Hard Disk Drives (HDDs) or Solid State Drives (SSDs), among other options for aggregates 142 and 192. In an example, storage aggregate 142 comprises a plurality of storage resources 144 (e.g., disks) provided in a RAID (redundant array of independent disks) configuration. RAID refers to storage technology that combines multiple disks into a logical unit for data protection and faster performance. Similarly, storage aggregate 192 includes its own set of storage resources 194 (e.g., storage drives). In general, a plurality of storage aggregates may exist in shared storage at a site and each storage aggregate generally may utilize a subset or portion of an entire set of storage resources that are available at a site.

In one example, storage aggregate 142 is comprised of five storage drives (e.g., storage resources 144) in a RAID configuration. It should also be understood that shared storage 140 may include other available storage aggregates and other storage resources. For example, shared storage 140 may be comprised of dozens, hundreds, or even thousands of storage drives. Thus, in one example, storage aggregate 142 generally represents an aggregation or grouping of some subset of available storage.

In an example, storage aggregate 142 and storage aggregate 192 are created as a synchronized RAID mirror. A synchronized RAID mirror generally refers to a configuration where a storage aggregate is mirrored between two different sites (e.g., geographic locations). In one example, an administrator creates a storage aggregate 142 as a synchronized RAID mirror using available storage resources associated with cluster A 110 and available storage resources associated with cluster B 160. For example, a set of requested storage drives from shared storage 140 is allocated to storage aggregate 142 as storage resources 144. In addition, an identical storage aggregate 192 with the same storage resource 194 configuration and geometry is created in shared storage 190. Further, a mirroring relationship is established between storage aggregate 142 and storage aggregate 192.

In an example, storage aggregate 142 and storage aggregate 192 are configured as a synchronized RAID mirror. Therefore, when a client writes data to either storage aggregate 142 or storage aggregate 192, the update is automatically mirrored to the other aggregate at a different site. Thus, when a switchover occurs, a DR partner has a mirrored copy of the other site's data and may assume operations of the other site with little or no disruption.

In an example, node A1 120, node A2 130, node B1 170 and node B2 180 each include its own respective switchover manager (switchover managers 102A, 102B, 102C, and 102D, respectively). Switchover manager 102A-102D is computer software that manages switchover operations between cluster A 110 and cluster B 160. In an example, switchover manager 102A-102D may be part of an operating system (OS) running on a node, may include one or more extensions that supplement core OS functionality, and also may include one or more applications that run on an OS. In one example, switchover manager 102A-102D is provided as part of a storage operating system that runs on a node.

In an example, an administrator invokes switchover functionality by issuing a switchover command using a command line or graphical user interface (GUI). For example, an administrator may issue a switchover command either prior to or after an outage occurs on a cluster at a specific site to transfer operations from the cluster to another cluster at a different site.

In an example, a planned or unplanned outage may occur at the site of cluster A 110. A system administrator ("administrator") issues a switchover command from a node on cluster B 160 to invoke switchover manager functionality that transfers operations from cluster A 110 to cluster B 160. For example, the administrator may issue the switchover command either from node B1 170 to invoke switchover manager 102C or from node B2 180 to invoke switchover manager 102D, regardless of which node is configured as the master node for cluster B 160.

In an example, a switchover manager on cluster B 160 (e.g., switchover manager 102C or switchover manager 102D) performs a switchover from cluster A 110 to cluster B 160 by changing ownership of one or more volumes (e.g., synchronized RAID mirror volumes) in shared storage 190 from a node on cluster A 110 to a node on cluster B 160 (e.g., node B1 170 or node B2 180). After volume ownership changes, then the transitioned volumes are initialized when brought online with the cluster B 160 node as the owner. Further, any buffered data previously replicated from NVRAM on cluster A 110 (e.g., NVRAM 122 or NVRAM 132) to NVRAM on cluster B 160 (e.g., NVRAM 172 or NVRAM 182) is written to the volumes (e.g., storage aggregate 192).

In an example, when replicated buffered data from cluster A 110 is written to the volumes, then the switchover to cluster B 160 is complete. Further, the switchover from cluster A 110 to cluster B 160 may be transparent to clients, and cluster B 160 may provide the same services as cluster A 110 with little or no interruption. In one example, operations that have been switched over to cluster B 160 may be switched back to cluster A 110, for example at a later time, after a full recovery of site A 110.

In some examples, data loss may occur between cluster A 110 at one site and cluster B 160 at a remote site prior to the switchover. For example, data loss may occur between the clusters when network 150 communication is disrupted or discontinued for some period of time.

Non-detectable or "silent" data loss generally describes a scenario where updates written to NVRAM and/or shared storage 140 (e.g., of a synchronized RAID mirror) on one cluster (e.g., cluster A 110) are not replicated to a DR partner cluster (e.g., cluster B 160) before a switchover occurs. In such scenarios, cluster B 160 (for example) may assume operations of cluster A 110 in response to a switchover command. However, any NVRAM and shared storage updates that failed to transfer from cluster A 110 to cluster B 160 prior to the switchover due to communication loss are unknown to cluster B 160 and may be lost without detection or notice. Further, if cluster B 160 immediately resumes operations of cluster A 110 in response to a switchover when silent data loss has occurred, future transactions that depend on the missing data may fail or may result in data corruption and inconsistency unless some repair or remediation is undertaken.

FIG. 2 illustrates an example system architecture 200 for mirroring data stored in NVRAM of a node to another node, in accordance with various examples of the present disclosure. System architecture 200 includes cluster A 110, which includes node A1 120 and node A2 130, and cluster B 160, which includes node B1 170 and node B2 180.

Each node may include NVRAM 201 (e.g., NVRAM) that is divided into a plurality of partitions. In the example illustrated in FIG. 2, the NVRAM of each node is divided into four partitions. For example, node A1 120 includes a first partition 202A, second partition 204A, third partition 206A, and fourth partition 208A. First partition 202A may be a local partition that stores buffered data for node A1 120. Second partition 204A may be a partition that is dedicated to storing a copy of the contents stored in the local partition of an HA partner's NVRAM (e.g., the local partition of node A2 130). Third partition 206A may be a partition that is dedicated to storing a copy of the contents stored in the local partition of a DR partner's NVRAM (e.g., the local partition of node B1 170). Fourth partition 208A may be a working area used to hold data as it is flushed to storage volume or to store data during and after a switchover. This description of the NVRAM also applies to node A2 130, node B1 170, and node B2 180 and each of their respective NVRAMs.

In an example, node A1 120 receives operations "1", "2", "3" from a client and stores these operations into a first log in NVRAM 201A before writing the operations to storage volume. Node A1 120 mirrors a plurality of operations to node A2 130 (node A1 120's HA partner) and to node B1 170 (node A1 120's DR partner). In an example, the contents of the first log stored in NVRAM 201A of node A1 120 are synchronously mirrored to node A2 130 and node B1 170. For example, the contents stored in first partition 202A of NVRAM 201A is mirrored to second partition 204B of NVRAM 201B at node A2 130, which stores a copy of the contents of the first log (operations "1", "2", "3") at second partition 204B. Additionally, the contents stored in first partition 202A of NVRAM 201A is mirrored to third partition 206C of NVRAM 201C at node B1 170, which stores a copy of the contents of the first log (operations "1", "2", "3") at third partition 206C. A consistency point may be invoked that flushes the contents stored in the first log to storage volume.

In an example, while the first log is being flushed to storage volume, node A1 120 may continue to receive operations from one or more clients and store these operations in a second log in first partition 202A. The first log may be available for storing operations for a current consistency point, and the second log may be available for storing operations for a next consistency point, resulting in a "flip-flop" use of the logs in first partition 202A. For example, while the contents of one log are being flushed to storage volume, the other log may store incoming operations from clients.

Node A1 120 receives operations "4", "5", "6" from a client and stores these operations into the second log in NVRAM 201A before writing the operations to storage volume. The contents stored in the second log may be mirrored to second partition 204B of NVRAM 201B at node A2 130, which stores a copy of the contents of the second log (operations "4", "5", "6") at second partition 204B. Before the contents stored in the second log are mirrored to or received at node B1 170, however, a disruption may occur that causes only a subset of the contents in the second log to be stored at node B1 170. As illustrated in FIG. 2, node B1 170 stores operations "4" and "5" in third partition 206C, but is missing operation "6". The present disclosure provides techniques to enable such a loss of data to be detected as will explained in more detail below.

FIG. 3 illustrates a takeover of the volumes of node A1 120 by its HA partner, in accordance with various examples of the present disclosure. In FIG. 3, node A1 120 has failed, as indicated by the dashed lines. When node A1 120 fails, node A2 130 (node A1 120's HA partner) may takeover operations for node A1 120 including taking ownership of node A1 120's volumes. The takeover may be transparent to clients, and node A2 130 may provide the same services as node A1 120 with little or no interruption.

During the takeover of node A1 120 by node A2 130, node A2 130 may replay the first log (operations "1", "2", and "3") and the second log (operations "4", "5", and "6"). Node A2 130 may identify those operations that have been completed (e.g., flushed to storage volume) and those that have yet to be completed by node A1 120 (e.g., have not been flushed to storage volume). In an embodiment, node A2 130 maintains a count 302 of the number of operations yet to be completed by node A1 120. In an example, an operation is an input/output (I/O) operation such as a READ or a WRITE. Node A2 130 may identify the log (e.g., the second log storing operations "4", "5", and "6") storing content that has not yet been flushed to storage volume and may determine an entry count 302, which is a number of operations in the identified log.

For example, node A2 130 may recognize that operations "1", "2", and "3" in the first log have already been completed and flushed to storage volume and may also recognize that operations "4", "5", and "6" in the second log have not yet been completed and have not yet been flushed to storage volume. Accordingly, node A2 130 may maintain a count 302 of three, indicating that three operations ("4", "5", and "6") have yet to be completed. Node A2 130 mirrors count 302, an indication of the number of operations yet to be completed by node A1 120 or node A2 130, to node B2 180. Node B2 180 receives the indication of the number of operations yet to be completed and stores it.

In the example illustrated in FIG. 3, node A2 130 stores count 302 in NVRAM 201B. For example, first partition 202B may have a "count" field in the header that stores count 302. If count 302 is stored in first partition 202B of NVRAM 201B at node A2 130, when the contents in first partition 202B are mirrored to node B2 180, count 302 is mirrored to third partition 206D of NVRAM 201D at node B2 180. In another example, node A2 130 stores count 302 at a location different from NVRAM 201B. In such an example, if count 302 is stored at a location different from NVRAM 201B, node A2 130 may separately send a copy of count 302 to node B2 180.

Additionally, during the takeover of node A1 120 by node A2 130, node A2 130 may start accepting new requests for node A1 120's volumes. In the example illustrated in FIG. 3, node A2 130 receives operations "7", "8", "9", which were originally directed to node A1 120 from a client, and stores these operations into a first log in first partition 202B of NVRAM 201B before writing these operations to storage volume. Node A2 130 mirrors a plurality of operations to NVRAM of node A2 130's HA partner and DR partner. Node A2 130's HA partner has failed and thus, node A2 130 may prevent mirroring a plurality of operations to NVRAM of node A1 120. The contents stored in first partition 202B of NVRAM 201B is mirrored to third partition 206D of NVRAM 201D at node B2 180, which stores a copy of the contents of the first log (operations "7", "8", "9") at third partition 206D.

After node A2 130 finishes the takeover of node A1 120 (e.g., node A1 120's volumes), node A2 130 owns the volumes that were previously owned by node A1 120 and any future operations performed on those volumes are localized at node A2 130 (e.g., stored in first partition 202B of node A2 130).

Figure 4:
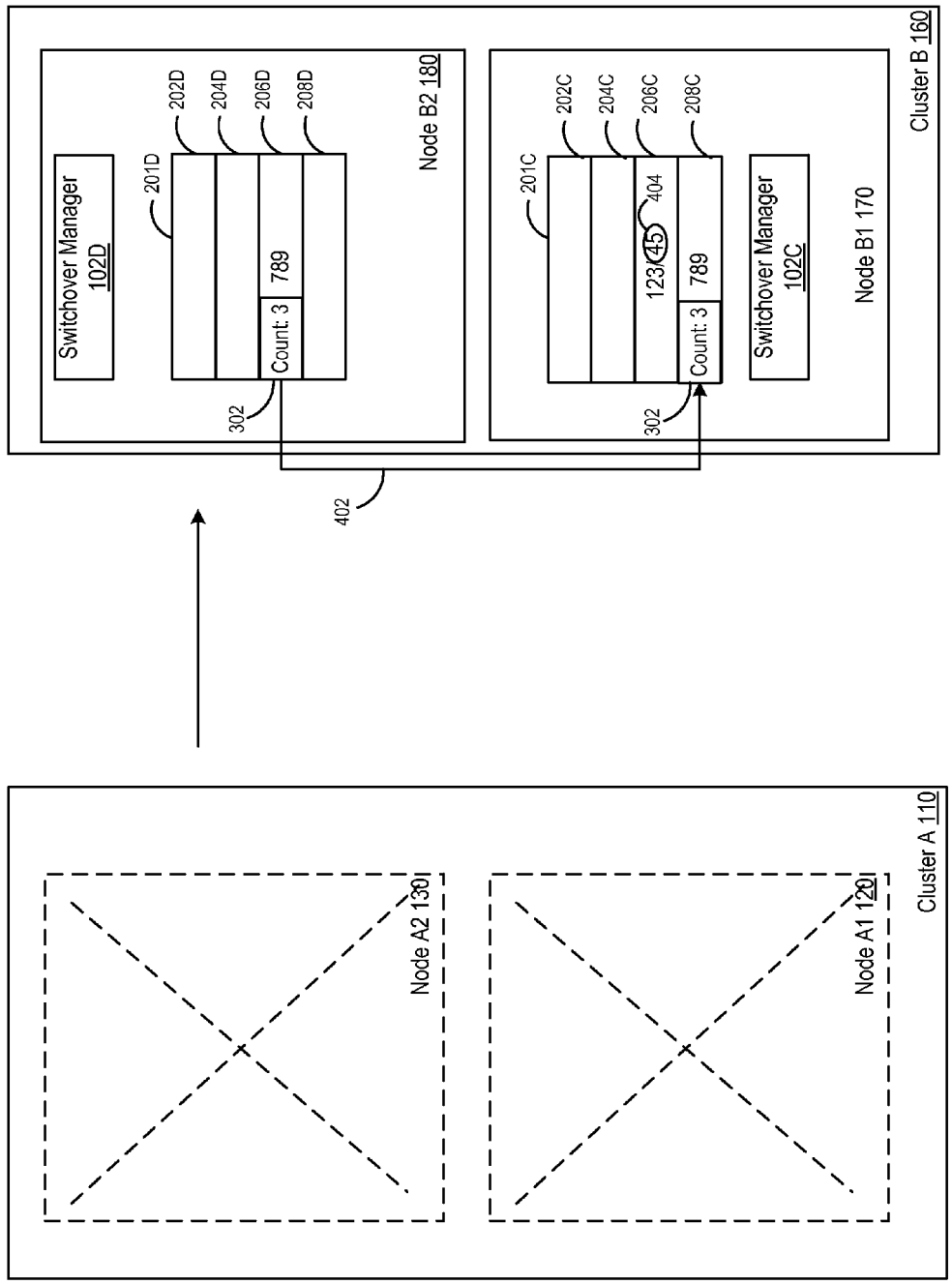
FIG. 4 illustrates a switchover from a node to its DR partner, in accordance with various examples of the present disclosure.

FIG. 4 illustrates a switchover from a node to its DR partner, in accordance with various examples of the present disclosure. In FIG. 4, cluster A 110 has failed, as indicated by the dashed lines. When cluster A 110 fails, cluster B 160 may assume or takeover operations when switchover occurs. Referring to FIG. 1, a switchover manager on cluster B 160 (e.g., switchover manager 102C or switchover manager 102D) may perform a switchover from cluster A 110 to cluster B 160 by changing ownership of one or more volumes (e.g., synchronized RAID mirror volumes) in shared storage 190 from a node on cluster A 110 to a node on cluster B 160 (e.g., node B1 170 or node B2 180).

In an example, the switchover may be performed by node B1 170 and/or node B2 180. During a switchover from cluster A 110 to cluster B 160, node B1 170 may assume operations of node A1 120's volumes with little or no disruption. Similarly, during a switchover from cluster A 110 to cluster B 160, node B2 180 may assume operations of node A2 130's volumes with little or no disruption.

During a switchover from node A1 120 in cluster A 110 to node B1 170 in cluster B 160, contents from node B2 180 are copied to node B1 170. In an example, the contents stored in third partition 206D of NVRAM 201D at node B2 180 are copied to fourth partition 208C of NVRAM 201C at node B1 170. As indicated by an arrow 402, the operations "7", "8", and "9" along with count 302 stored in third partition 206D of NVRAM 201D at node B2 180 are copied to fourth partition 208C of NVRAM 201C at node B1 170. Accordingly, the NVRAM content for node A1 120's volumes is available on node B1 170, which is node A1 120's DR partner. Further, NVRAM 201C of node B1 170 stores operations 404 that may include zero or more operations that have not yet been written to a storage drive at either node A1 120 or node A2 130.

Node B1 170 compares count 302, which is an indication of a number of operations yet to be completed by node A1 120, to a number of operations in operations 404, which is stored in NVRAM 201C of node B1 170 (e.g., third partition 206C). In the example illustrated in FIG. 4, operations 404 include two operations, operations "4" and "5", and accordingly the number of operations in operations 404 is two. Operations 404 correspond to node A1 120 and include zero or more operations that have not yet been completed (e.g., written to a storage drive at either node A1 120, node A2 130, or node B1 170).

If count 302 matches the number of operations in operations 404 then node B1 170 may determine that no data loss between node A1 120 and node B1 170 has occurred and that node B1 170 has the operations that it should have as node A1 120's DR partner. In such an example, operations 404 would include operations "4", "5", and "6", and no operations are missing from NVRAM 201C. Node B1 170 may perform a replay of operations 404 by writing operations 404 of node A1 120 to a storage drive at node B1 170.

In contrast, if count 302 does not match the number of operations in operations 404 then node B1 170 may determine that data loss between node A1 120 and node B1 170 has occurred and that node B1 170 does not have all of the operations that it should have as node A1 120's DR partner. In the example illustrated in FIG. 4, operations 404 includes operations "4" and "5", and the operation "6" is missing from NVRAM 201C. Accordingly, node B1 170 may determine that at least one operation is missing from operations 404.

If an operation is missing from operations 404 but the missing operation has been completed at node A2 130, node B1 170 may perform a replay of operations 404 that are stored at node B1 170 by writing operations 404 of node A1 120 to a storage drive at node B1 170. Although the missing operation is not stored at node B1 170, node A2 130 has already completed the operation and it may be unnecessary for node B1 170 to fail a storage aggregate that corresponds to one or more volumes of node B1 170.

If, however, the missing operation has not been completed at node A2 130, node B1 170 may fail a storage aggregate that corresponds to one or more volumes of node B1 170. In an example, in response to determining that at least one operation is missing and has not yet been completed (e.g., by node A1 120 or node A2 130), node B1 170 fails a storage aggregate that corresponds to one or more volumes of node B1 170, the one or more volumes being affected by the missing operation. In such an example, the failure may be on a per-aggregate basis. In another example, in response to determining that at least one operation is missing, node B1 170 fails one or more volumes of node B1 170 affected by the missing operation. In such an example, the failure may be on a per-volume basis. Node B1 170 may perform a best effort replay of the operations stored in the second log of first partition 202A (e.g., operations "4", "5", and "6") before failing the aggregate or the one or more volumes. The best effort replay may be a replay of operations 404, which may be missing one or more operations stored in the second log of first partition 202A. The best effort replay may include replaying a subset (e.g., fewer than all) of the operations in the second log of first partition 202A. In an example, node B1 170 may replay only operations "4" and "5", and then stop. In such an example, node B1 170 does not replay operations "7", "8", or "9" and may decline client traffic. It may be undesirable for node B1 170 to replay operations "7", "8", or "9" because one of these operations may depend on the missing operation. For example, if the missing operation creates a file and operation "7" accesses the file, data may be corrupted.

Further, performing the switchover from node A1 120 to node B1 170 includes changing ownership of one or more volumes from node A1 120 to node B1 170 and initializing the one or more volumes with node B1 170 as owner of the one or more volumes. Performing the switchover from node A1 120 to node B1 170 may also include writing buffered data replicated from node A1 120 to one or more storage resources associated with node B1 170. The buffered data may include one or more updates stored in non-volatile memory of node B1 170 that occurred on node A1 120 prior to the switchover.

Figure 5:
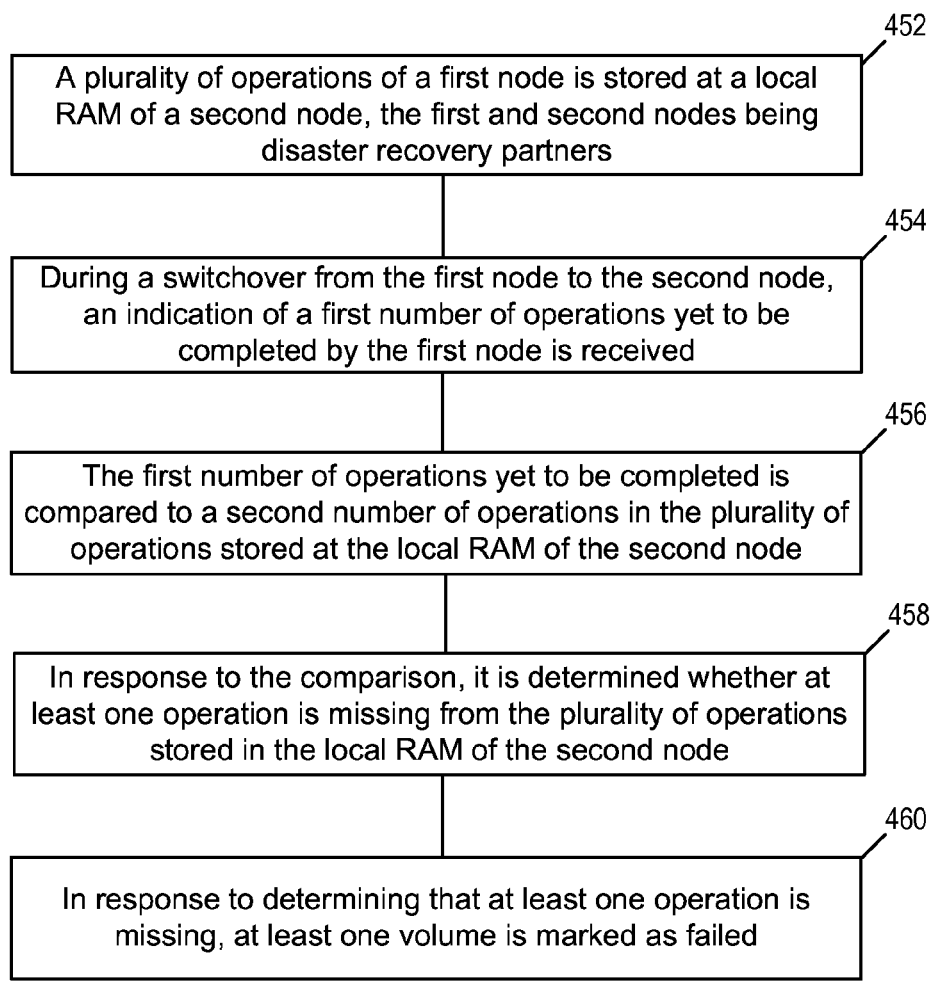
FIG. 5 is a flow diagram illustrating an example of a method for detecting data loss during site switchover, in accordance with various examples of the present disclosure.

FIG. 5 is a flow diagram illustrating an example of a method for detecting data loss during site switchover. The method 450 may be performed by processing logic that may comprise hardware (circuitry, dedicated logic, programmable logic, microcode, etc.), software (such as instructions run on a general purpose computer system, a dedicated machine, or processing device), firmware, or a combination thereof. In an example, the method 450 is performed by a switchover manager of a computer system or storage controller (e.g., one of switchover manager 102A-102D of FIG. 1). As an example, the method 450 is described in context of switchover manager 102C.

Method 450 begins at a block 452. At block 452, a plurality of operations of a first node is stored at NVRAM of a second node, the first and second nodes being DR partners. In an example, the first node is node A1 120, and the second node is node B1 170. Referring to FIG. 2, log 0 of partition 202A may include operations "1,", "2", and "3", and log 1 of partition 202A may include operations "4", "5", and "6". One or more operations stored in the NVRAM of node A1 120 may be mirrored to the NVRAM of node B1 170. One or more of the operations in log 0 or log 1, however, may not have been properly mirrored to node B1 170 and stored at node B1 170.

At a block 454, during a switchover from the first node to the second node, an indication of a first number of operations yet to be completed by the first node is received. In an example, an administrator issues a switchover command on node B1 170 to transfer operations of cluster A 110 to cluster B 160. For example, the administrator may issue the switchover command prior to a scheduled maintenance period or an unplanned site outage involving cluster A 110. In one example, an administrator or other user may issue a switchover command using a command line or graphical user interface (GUI). Switchover invocation also may be automated, for example, based on time, one or more detected events, or other criteria. In an example, count 302 is a first number of operations yet to be completed by node A1 120. Count 302 may be three, which refers to the three operations "4", "5", and "6" that have yet to be flushed to storage volume by node A1 120.

At a block 456, the first number of operations yet to be completed is compared to a second number of operations in the plurality of operations stored at the NVRAM of the second node. In an example, the second number of operations is the number of operations in operations 404. Referring to FIG. 4, operations 404 includes operations "4" and "5", and the second number of operations is two. In an example, node B1 170 compares the first number (e.g., 3) to the second number (e.g., 2).

At a block 458, in response to the comparison, it is determined whether at least one operation is missing from the plurality of operations stored in the NVRAM of the second node. If the first and second numbers match, then node B1 170 determines that no operations are missing from the plurality of operations. If, however, the first and second numbers do not match, then node B1 170 determines that at least one operation is missing from the plurality of operations. In keeping with the above example, node B1 170 compares the first number (e.g., 3) to the second number (e.g., 2) and determines that they do not match. Thus, node B1 170 may determine that at least one operation is missing from operation 404.

At a block 460, in response to determining that at least one operation is missing, at least one volume is marked as failed. The volume is affected by the missing operation. The scope of embodiments may include other actions as well. For instance, some applications (e.g., a database application storing data to the storage volumes) may provide an application-level recovery. In such an example, the administrator may apply the application-level recovery to the affected volumes or aggregates to apply any lost data and then flush any subsequent operations to volume.

Figure 6:
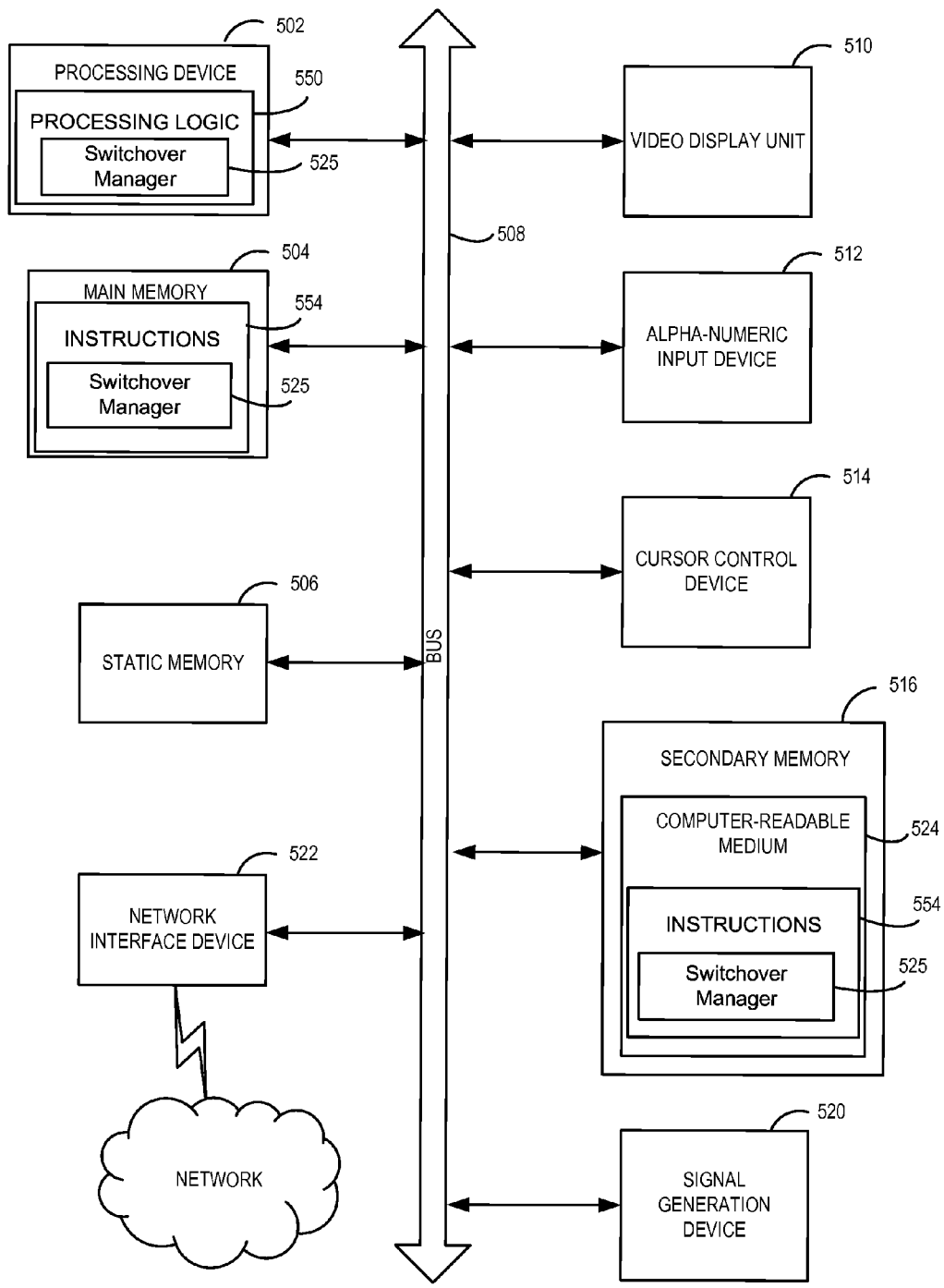
FIG. 6 illustrates a diagrammatic representation of a machine in the example form of a computer system.

FIG. 6 illustrates a diagrammatic representation of a machine in the exemplary form of a computer system 500 within which a set of instructions, for causing the machine to perform any one or more of the methodologies discussed herein, may be executed. In an example, computer system 500 may correspond to a node (e.g., node A1 120, node A2, 130, node B1 170, or node B2 180) in system architecture 100 of FIG. 1.

In examples of the present disclosure, the machine may be connected (e.g., networked) to other machines via a Local Area Network (LAN), a metropolitan area network (MAN), a wide area network (WAN)), a fibre channel connection, an inter-switch link, an intranet, an extranet, the Internet, or any combination thereof. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a storage controller, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processing devices such as a microprocessor, central processing unit, or the like. The processing device may include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

In an example involving a storage controller, a video display unit 510, an alphanumeric input device 512, and a cursor control device 514 are not part of the storage controller. Instead, an application running on a client or server interfaces with a storage controller, and a user employs a video display unit 510, an alphanumeric input device 512, and a cursor control device 514 at the client or server.

The secondary memory 516 may include a machine-readable storage medium (or more specifically a computer-readable storage medium) 524 on which is stored one or more sets of instructions 554 embodying any one or more of the methodologies or functions described herein (e.g., switchover manager 525). The instructions 554 may also reside, completely or at least partially, within the main memory 504 and/or within the processing device 502 during execution thereof by the computer system 500 (where the main memory 504 and the processing device 502 constitute machine-readable storage media).

While the computer-readable storage medium 524 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 500 additionally may include a switchover manager module (not shown) for implementing the functionalities of a switchover manager (e.g., switchover manager 102A, switchover manager 102B, switchover manager 102C, or switchover manager 102D of FIG. 1). The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "storing", "computing", "comparing", "performing", "writing", "providing," "failing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A method, comprising:
   storing, at a non-volatile random access memory (NVRAM) of a first node, a plurality of operations of a second node, the first node and the second node being disaster recovery partners;
   during a switchover from the second node to the first node, receiving an indication of a first number of operations yet to be completed by the second node;
   comparing the first number of operations yet to be completed to a second number of operations in the plurality of operations stored at the NVRAM of the first node to determine whether at least one operation yet to be completed by the second node is missing from the plurality of operations stored in the NVRAM of the first node; and
   in response to determining that at least one operation is missing:
      performing a best effort replay of the plurality of operations of the second node; and
      failing at least one storage volume.

2. The method of claim 1, wherein the switchover is performed by the first node and a third node, the third node being a High Availability (HA) partner of the first node and not a HA partner or a disaster recovery partner of the second node.

3. The method of claim 2, wherein the third node stores a second plurality of operations of the second node and mirrors the second plurality of operations to the first node.

4. The method of claim 3, further comprising:
   performing the best effort replay of the plurality of operations of the second node before failing the at least one volume.

5. The method of claim 3, wherein the performing the best effort replay includes replaying a subset of operations corresponding to the first number of operations and not replaying the second plurality of operations.

6. The method of claim 1, wherein the first node and the second node comprise storage nodes in a geographically-distributed storage network.

7. The method of claim 1, further comprising:
   writing the plurality of operations of the second node to a storage volume at the first node.

8. The method of claim 1, wherein the operations yet to be completed include input/output (I/O) operations that have not yet been written to a storage drive at either the first node or the second node.

9. The method of claim 1, wherein the NVRAM of the first node comprises NVRAM that stores operations that have not yet been written to a storage drive at either the first node or the second node.

10. The method of claim 1, further comprising:
    performing the switchover from the second node to the first node, wherein the performing includes changing ownership of one or more volumes from the second node to the first node and initializing the one or more volumes with the first node as owner of the one or more volumes.

11. The method of claim 1, further comprising:
    writing buffered data replicated from the second node to one or more storage resources associated with the first node.

12. The method of claim 11, wherein the buffered data comprises one or more updates stored in non-volatile memory of the first node that occurred on the second node prior to the switchover.

13. The method of claim 1, wherein the first node is part of a first high availability cluster at a first location and the second node is part of a second high availability cluster at a second location remote from the first location.

14. The method of claim 1, further comprising:
in response to determining that at least one operation is missing, failing at least one aggregate including the at least one volume, the at least one volume being owned by the first node and being affected by the at least one missing operation.

15. The method of claim 1, wherein the method is performed by a storage controller.

16. A computing device for storing and retrieving data from a plurality of storage volumes, the computing device comprising:
a memory containing machine readable medium comprising machine executable code having stored thereon instructions for performing a method; and
a processor coupled to the memory, the processor configured to execute the machine executable code to cause the processor to:
write, to non-volatile memory of a first node, a plurality of operations of a second node, wherein the first node and the second node are distributed geographically;
receive an indication of a first number of operations yet to be completed by the second node after failure of the second node;
determine whether at least one operation is missing from the plurality of operations by calculating whether the first number of operations is larger than a second number of operations, of the second node, known to the first node; and
in response to the determination that at least one operation is missing:
perform a best effort replay of the plurality of operations of the second node; and
make a volume, of the plurality of storage volumes, unavailable for Input/Output (I/O) operations.

17. The computing device of claim 16, wherein a switchover operation is performed by the first node and a third node in response to failure of the second node, the third node being a High Availability (HA) partner of the first node and not a HA partner or a disaster recovery partner of the second node, and wherein the third node stores a second plurality of operations of the second node and mirrors the second plurality of operations to the first node.

18. The computing device of claim 17, wherein the machine executable code causes the processor to:
perform the best effort replay of the plurality of operations of the second node before making the volume unavailable.

19. The computing device of claim 17, wherein the machine executable code causes the processor to:
replay a subset of operations corresponding to the first number of operations and does not replay the second plurality of operations.

20. A non-transitory computer-readable medium having instructions recorded thereon, that when executed by a processor, cause the processor to perform operations, comprising:
storing, at a first node, a plurality of operations of a second node, the first node and the second node being mirrored partners;
during a switchover from the second node to the first node, receiving a first count of operations yet to be completed by the second node;
counting the th plurality of operations of the second node, stored at the first node, to determine a second count of operations of the second node known to the first node;
comparing the first count of operations yet to be completed by the second node to the second count of operations in the plurality of operations stored at the first node to determine a count of operations, yet to be completed by the second node, that are not known to the first node; and
in response to the count indicating that at least one operation is not known to the first node, failing a storage volume.

* * * * *